United States Patent
Crabtree, II

(10) Patent No.: US 8,622,489 B2
(45) Date of Patent: Jan. 7, 2014

(54) CABINET SYSTEM AND METHOD OF ASSEMBLING THE SAME

(75) Inventor: Phillip C. Crabtree, II, Owensboro, KY (US)

(73) Assignee: InSourcing Specialists, Inc., Greensboro, NC (US)

( * ) Notice: Subject to any disclaimer, the term of this patent is extended or adjusted under 35 U.S.C. 154(b) by 0 days.

(21) Appl. No.: 12/751,082

(22) Filed: Mar. 31, 2010

(65) Prior Publication Data

US 2010/0289389 A1    Nov. 18, 2010

Related U.S. Application Data

(63) Continuation of application No. 11/464,987, filed on Aug. 16, 2006, now abandoned.

(51) Int. Cl.
A47B 47/00    (2006.01)

(52) U.S. Cl.
USPC ......... 312/263; 312/265.5; 312/260; 312/108

(58) Field of Classification Search
USPC ........ 312/257.1, 260, 263, 264, 265.5, 265.6, 312/108, 111, 265.3, 265.4; 403/231
See application file for complete search history.

(56) References Cited

U.S. PATENT DOCUMENTS

| | | |
|---|---|---|
| 419,920 A | 1/1890 | Campbell |
| 861,911 A | 7/1907 | Stewart et al, |
| 992,103 A | 5/1911 | Atkinson |
| 1,954,242 A | 4/1934 | Heppenstall |
| 2,284,480 A | 5/1942 | Schuh |
| 2,549,379 A | 4/1951 | Liebel |
| 2,884,296 A | 4/1959 | Meilinger at al. |
| 3,021,187 A | 2/1962 | Mitchell |
| 3,664,011 A | 5/1972 | Labastrou |
| 3,674,328 A | 7/1972 | White |
| 3,713,718 A | 1/1973 | Lucci |
| 3,747,885 A | 7/1973 | Ciancimino |
| 3,989,156 A | 11/1976 | Lowry |
| 4,047,777 A | 9/1977 | Pfeifer et al. |
| 4,127,153 A | 11/1978 | Cipollone |
| 4,279,455 A | 7/1981 | Santo |
| 4,750,794 A | 6/1988 | Vegh |
| 4,832,421 A | 5/1989 | Shoffner |
| 4,880,284 A | 11/1989 | Dickson et al. |
| 5,527,103 A | 6/1996 | Pittman |
| 5,588,726 A | 12/1996 | Lee |
| 5,682,936 A | 11/1997 | Higdon, Jr. |
| 5,803,561 A | 9/1998 | Puehlhorn |

(Continued)

Primary Examiner — Darnell Jayne
Assistant Examiner — Andres F Gallego
(74) Attorney, Agent, or Firm — Woodard, Emhardt, Moriarty, McNett & Henry LLP

(57) ABSTRACT

A front panel, a pair of side panels, a top panel, and a bottom panel connect to form a cabinet. Optionally, the cabinet includes a rear panel. The front panel includes a pair of master keyways. Each of side panels has a groove and a pair of side keyways. Each groove provides the side panel with an edge profile that connects with one master keyway to couple the side panels with the front panel. Each of top and bottom panels includes a pair of grooves. Each groove provides top and bottom panels with an edge profile that connects with one side keyway to couple the top and bottom panels with the side panels. Optionally, one of the top or bottom panels includes an extender and the front panel includes a groove wherein the extender is received within the groove to limit movement of the side panels.

21 Claims, 5 Drawing Sheets

(56) References Cited

U.S. PATENT DOCUMENTS

| | | |
|---|---|---|
| 6,082,069 A | 7/2000 | Chennaux |
| 6,123,126 A | 9/2000 | Shanahan et al. |
| 6,209,976 B1 | 4/2001 | Shear |
| 6,672,690 B1 | 1/2004 | Williams |
| 6,802,168 B1 | 10/2004 | Minnick |
| 7,641,414 B1 * | 1/2010 | Joyce .......................... 403/231 |
| 7,913,863 B2 | 3/2011 | Lin |
| 7,914,091 B1 * | 3/2011 | Joyce ........................... 312/263 |
| 2003/0155847 A1 | 8/2003 | Henkel |
| 2005/0023944 A1 | 2/2005 | Baker |
| 2006/0214545 A1 | 9/2006 | Wells et al. |
| 2008/0067906 A1 | 3/2008 | Robert et al. |
| 2009/0129859 A1 | 5/2009 | Andersson |
| 2009/0284111 A1 | 11/2009 | Hazzard et al. |
| 2010/0079045 A1 | 4/2010 | Yeh |
| 2011/0260592 A1 | 10/2011 | Lin et al. |

* cited by examiner

1

CABINET SYSTEM AND METHOD OF ASSEMBLING THE SAME

CROSS REFERENCE TO RELATED APPLICATION

This application is a continuation of application Ser. No. 11/464,987, filed Aug. 16, 2006, now abandoned, which is hereby incorporated by reference.

BACKGROUND

The present disclosure relates to a cabinet system used in kitchens or furniture design. Specifically, the present disclosure includes a front panel, a pair of side panels, a top panel, and a bottom panel that fit together to form a cabinet. Optionally, the cabinet can include a back panel or a rear panel.

Several techniques and systems have been developed for manufacturing and assembling cabinets. In a typical system, cabinet components are assembled using mechanical fasteners. In this type of system, often a skilled carpenter is required to assemble the cabinets, either in the manufacturing facility or at the final site of installation, for example a kitchen. The cabinets that are assembled in the manufacturing facility can be shipped in the assembled form to the final destination; however, this often requires large amounts of packing materials and shipping costs to do so. Unassembled cabinets can be shipped to the final destination, assembled, and installed at the final site of installation. However, these unassembled cabinets often require a skilled carpenter to assemble the cabinets which requires the homeowner to pay an additional cost of the carpenter to assemble and install the cabinets.

DESCRIPTION OF THE ILLUSTRATED EMBODIMENTS

Figure 1:
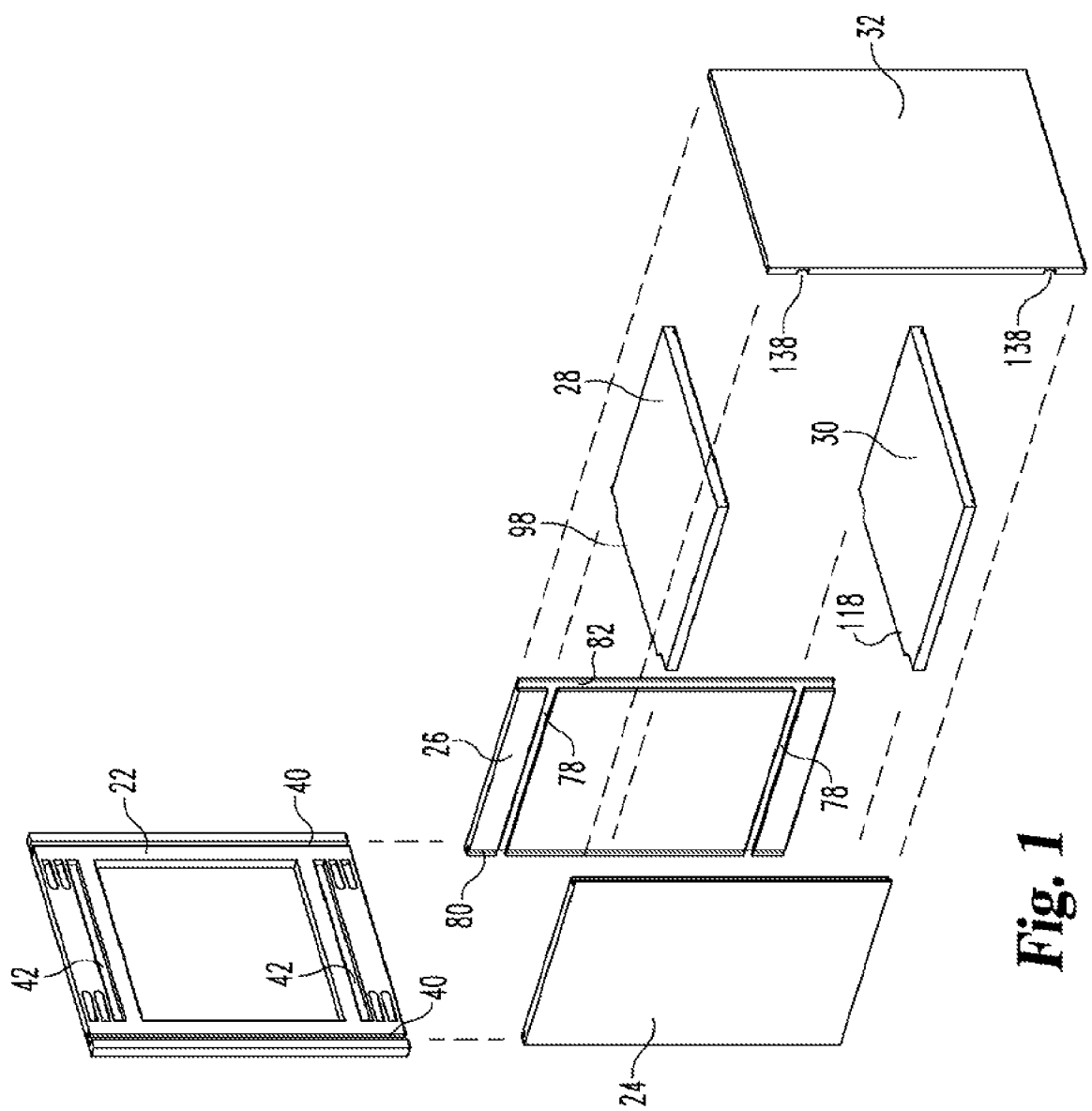
FIG. 1 is a perspective view of one embodiment of a cabinet device shown being assembled.

For the purposes of promoting an understanding of the principles of the disclosure, reference will now be made to the embodiments illustrated in the drawings and specific language will be used to describe the same. It will nevertheless be understood that no limitation of the scope of the claims is thereby intended. Any such alterations and further modifications in the illustrated device, and any such further applications of the principles as illustrated herein, are contemplated as would normally occur to one skilled in the art to which the disclosure relates.

Referring generally to the figures, there are shown embodiments of a cabinet device 20. In the illustrated embodiment in FIG. 1, device 20 includes a front panel 22, a right side panel 24, a left side panel 26, a top panel 28, and a bottom panel 30. Optionally, cabinet device 20 includes a rear panel 32. Front panel 22 (FIG. 2), right side panel 24 (FIG. 6), left side panel 26 (FIG. 9), top panel 28 (FIG. 11), bottom panel 30 (FIG. 14), and rear panel 32 (FIG. 17) can be made of various materials such as wood, metal, plastic, or a combination of materials.

Figure 3:
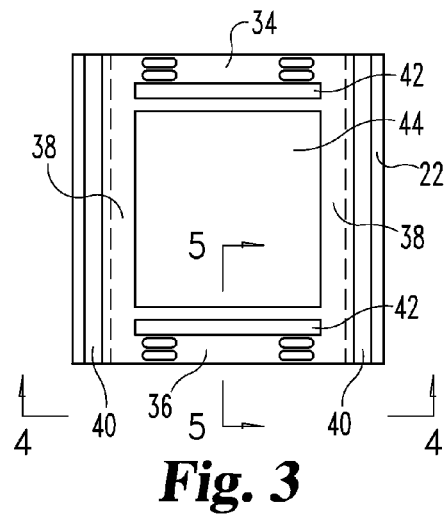
FIG. 3 is a front view of one embodiment of a front panel.
Figure 4:
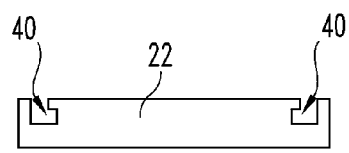
FIG. 4 is an end elevational view of the embodiment depicted in FIG. 3, taken along lines 4-4 in FIG. 3 and viewed in the direction of the arrows.
Figure 5:
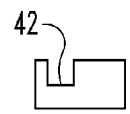
FIG. 5 is a cross-sectional view of the embodiment depicted in FIG. 3, taken along lines 5-5 in FIG. 3 and viewed in the direction of the arrows.

In the illustrated embodiment shown in FIG. 3, front panel 22 includes an upper portion 34, an opposite lower portion 36, and a pair of side portions 38. As illustrated, front panel 22 is a rectangular shape; however, in other embodiments front panel 22 can be a square, trapezoid, oval, or otherwise configured. Each of side portions 38 defines a master keyway 40. As illustrated in FIG. 4, master keyway 40 has an L-shape. Upper portion 34 and lower portion 36 each contain a groove 42. Groove 42 is rectangular in shape as illustrated in FIG. 5; however, in other embodiments, groove 42 can be shaped differently such as oval, triangular, polygonal, or otherwise configured. Optionally, front panel 22 defines an opening 44. Opening 44 is a rectangular shape; however, in other embodiments, opening 44 is square or otherwise configured.

Figure 6:
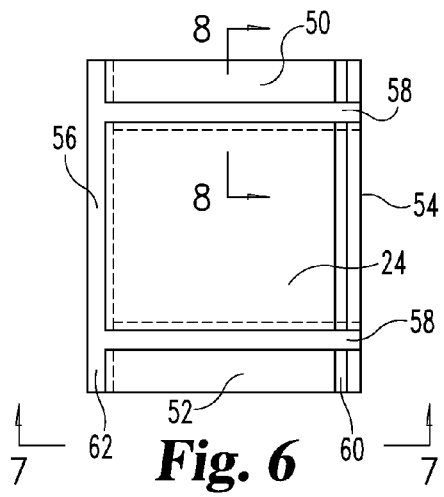
FIG. 6 is a front view of one embodiment of a right side panel.
Figure 7:
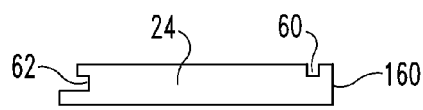
FIG. 7 is an end elevational view of the embodiment depicted in FIG. 6, taken along lines 7-7 in FIG. 6 and viewed in the direction of the arrows.
Figure 8:
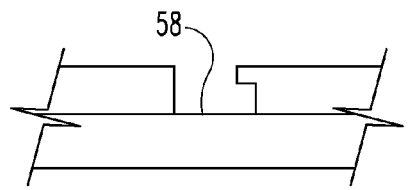
FIG. 8 is a cross-sectional view of the embodiment depicted in FIG. 6, taken along lines 8-8 in FIG. 6 and viewed in the direction of the arrows.

In the illustrated embodiment in FIGS. 6 and 7, right side panel 24 includes an upper portion 50, a lower portion 52, a first side portion 54, and a second side portion 56. Right side panel 24 is rectangular in shape; however, in other embodiments right side panel 24 can be a square, trapezoid, or otherwise configured. Upper portion 50 and lower portion 52 each define a side keyway 58. Side keyway 58 has an L shape as illustrated in FIG. 8. In one embodiment, master keyway 40 (FIG. 4) and side keyway 58 (FIG. 8) have substantially similar shapes and dimensions. First side portion 54 includes a groove 60. Groove 60 is rectangular in shape. Groove 60 provides right side panel 24 with an edge 160 having an L-shaped cross section. In other forms, groove 60 can be shaped differently such as circular, triangular, polygonal, or otherwise configured. In one form, groove 60 (FIG. 7) and groove 42 (FIG. 5) have substantially similar shapes and dimensions. Second side portion 56 includes a side notch 62. Side notch 62 is rectangular in shape. In other embodiments, side notch 62 is triangular, polygonal, or otherwise shaped.

Figure 9:
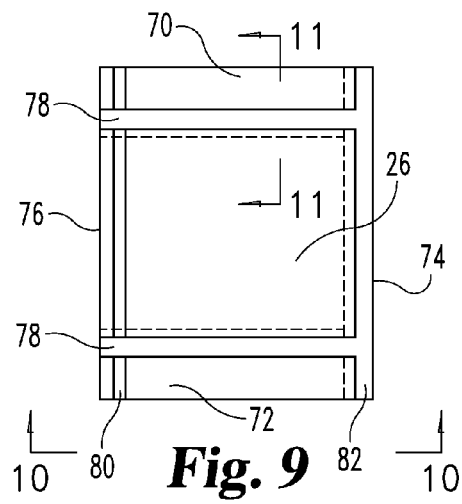
FIG. 9 is a front view of another embodiment of a left side panel.
Figure 10:
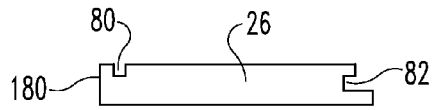
FIG. 10 is an end elevational view of the embodiment depicted in FIG. 9, taken along lines 10-10 in FIG. 9 and viewed in the direction of the arrows.
Figure 11:
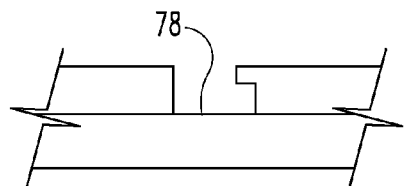
FIG. 11 is a cross-sectional view of the embodiment depicted in FIG. 9, taken along lines 11-11 in FIG. 9 and viewed in the direction of the arrows.

FIGS. 9 and 10 show an illustrated embodiment of left side panel 26. In the illustrated embodiment, left side panel 26 is similar to right side panel 24. In other forms, left side panel 26 can be different than right side panel 24. Left side panel 26 includes an upper portion 70, a lower portion 72, a first side portion 74, and a second side portion 76. Left side panel 26 is rectangular in shape in the illustrated embodiment. In other embodiments left side panel 26 can be square, trapezoid, or another shape. Upper portion 70 and lower portion 72 each define a side keyway 78. As illustrated in FIG. 11, side keyway 78 has an L shape. In one embodiment, master keyway 40 (FIG. 4) and side keyway 78 (FIG. 11) have substantially similar shapes and dimensions. In another embodiment, master keyway 40 (FIG. 4), side keyway 58 (FIG. 8), and side keyway 78 (FIG. 11) have similar shapes and dimensions. First side portion 74 includes a groove 80. Groove 80 is rectangular in shape. Groove 80 provides left side panel 26 with an edge 160 having an L-shaped cross section. In other forms, groove 80 can be shaped differently such as circular, triangular, polygonal, or otherwise configured. In one form, groove 80 (FIG. 10) and groove 42 (FIG. 5) have substantially similar shapes and dimensions. In another form, groove 80, groove 60 (FIG. 7), and groove 42 (FIG. 5) have similar shapes and dimensions.

Figure 12:
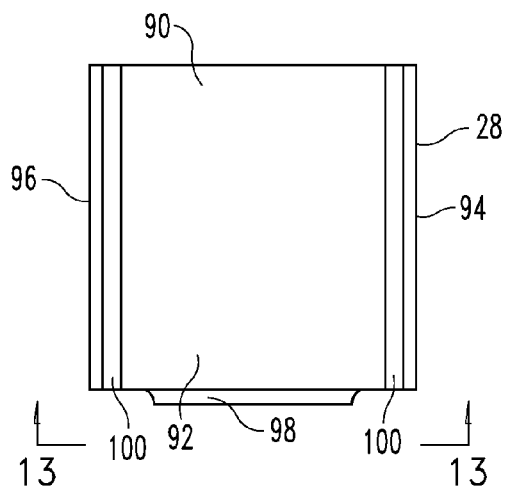
FIG. 12 is a front view of one embodiment of a top panel.
Figure 14:
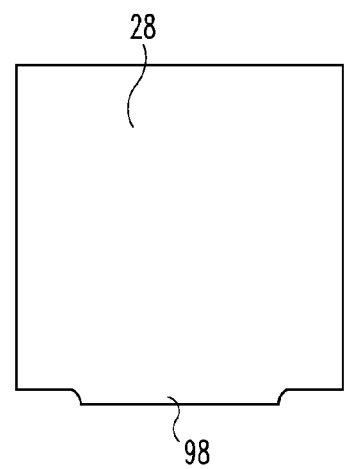
FIG. 14 is a rear view of the embodiment depicted in FIG. 12.
Figure 13:
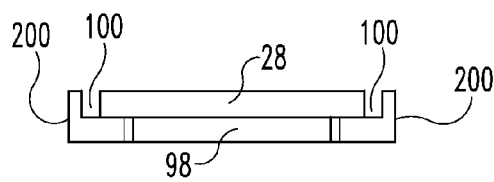
FIG. 13 is an end elevational view of the embodiment depicted in FIG. 12, taken along lines 13-13 in FIG. 12 and viewed in the direction of the arrows.

In the illustrated embodiment in FIGS. 12, 13, and 14, top panel 28 includes an upper portion 90, a lower portion 92, a first side portion 94, and a second side portion 96. Top panel 28 is rectangular in shape; however, in other embodiments top panel 28 can be a square, trapezoid, or otherwise configured. Lower portion 92 includes a top extender 98. Top extender 98 is substantially rectangular in shape with a pair of curved edges. In one form, top extender 98 is sized to fit within groove 42 (see FIGS. 3 and 5) of front panel 22 as discussed below. Both first side portion 94 and second side portion 96 include a groove 100. Groove 100 is rectangular in shape or has a U shape; however, in other forms groove 100 is otherwise configured. Each of the grooves 100 provides the top panel 28 with an edge 200 having an L-shaped cross section. In one form groove 100 is substantially the same cross-sectional size as groove 60 (FIG. 7). Each edge 200 with an L-shaped cross section is sized to fit or connect with side keyway 58 as discussed below.

Figure 15:
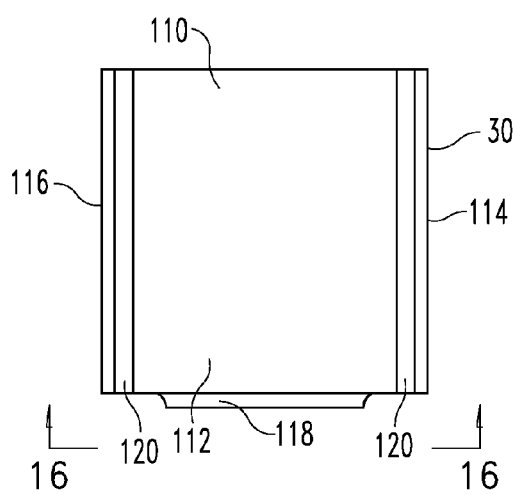
FIG. 15 is a front view of one embodiment of a bottom panel.
Figure 17:
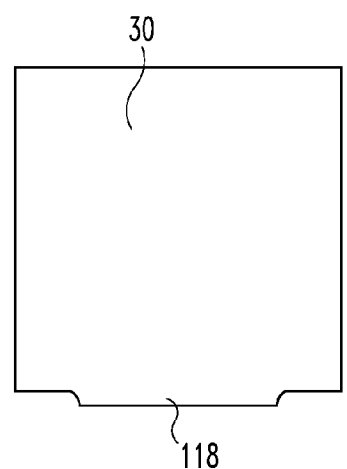
FIG. 17 is a rear view of the embodiment depicted in FIG. 15.
Figure 16:
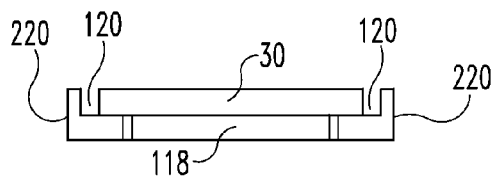
FIG. 16 is an end elevational view of the embodiment depicted in FIG. 15, taken along lines 16-16 in FIG. 15 and viewed in the direction of the arrows.

In the illustrated embodiment in FIGS. 15, 16, and 17, bottom panel 30 includes an upper portion 110, a lower portion 112, a first side portion 114, and a second side portion 116. Bottom panel 30 is rectangular in shape; however, in other embodiments bottom panel 28 is otherwise configured. In one form, bottom panel 30 is substantially identical to top panel 28 (see FIG. 12). Lower portion 112 includes a bottom extender 118. Bottom extender 118 is rectangular in shape with a pair of curved edges; however, in other forms bottom extender 118 is square or otherwise configured. As illustrated, bottom extender 118 is substantially similar to top extender 98 (see FIG. 12). In one form, bottom extender 118 is sized to fit within groove 42 of front panel 22 (FIGS. 3 and 5). Both first side portion 114 and second side portion 116 include a groove 120. Groove 120 is rectangular in shape or has a U shape; however, in other forms groove 120 is otherwise configured. Each of grooves 120 provides bottom panel 30 with an edge 220 having an L-shaped cross section. In one form groove 120 is substantially the same cross-sectional size as groove 60 and groove 100 (FIGS. 12 and 13). Groove 120 is sized to fit or connect with side keyway 58 (FIGS. 6 and 8) as discussed below.

Figure 18:
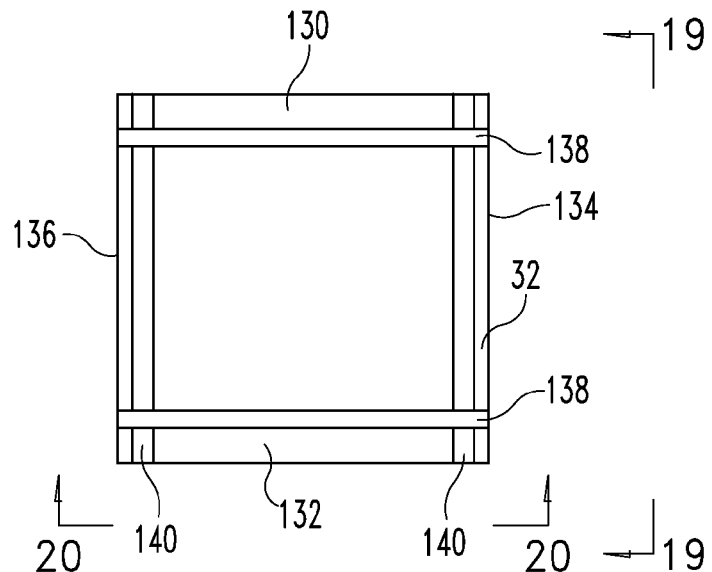
FIG. 18 is a front view of one embodiment of a rear panel.
Figure 19:
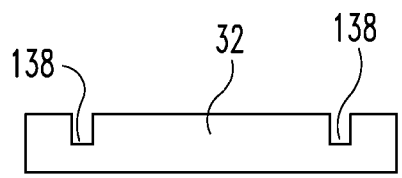
FIG. 19 is an end elevational view of the embodiment depicted in FIG. 18, taken along lines 19-19 in FIG. 18 and viewed in the direction of the arrows.
Figure 20:
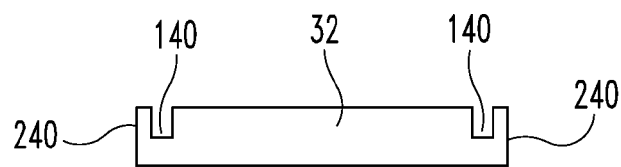
FIG. 20 is a side elevational view of the embodiment depicted in FIG. 17, taken along lines 20-20 in FIG. 18 and viewed in the direction of the arrows.

FIGS. 18, 19, and 20 illustrate rear panel 32. Rear panel 32 includes an upper portion 130, a lower portion 132, a first side portion 134, and a second side portion 136. Rear panel 32 is rectangular in shape. In other forms, rear panel 32 is substantially the same size as front panel 22 (FIG. 3). Upper portion 130 and lower portion 132 each include a slot 138. Slot 138 is rectangular in shape; however, in other forms slot 138 is square, triangular, or otherwise configured. Slot 138 is sized to fit onto either upper portion 90 of top panel 28 (FIG. 12) or upper portion 110 of bottom panel 30 (FIG. 15) as described below. Each of first side portion 134 and second side portion 136 include a back groove 140. Back groove 140 is rectangular in shape as illustrated. In other forms, back groove 140 is square, triangular, or otherwise configured. The back grooves 140 provide the first side portion 134 and second side portion 136 with an edge 240 having an L-shaped cross section. Optionally, back groove 140 and edge 240 are sized to fit with or contact side notch 62 (FIGS. 6 and 7) or side notch 82 (FIGS. 9 and 10) as discussed below. In the illustrated embodiment, slot 138 is rectangular in shape. In other forms, slot 138 is triangular, polygonal, or otherwise configured.

Figure 2:
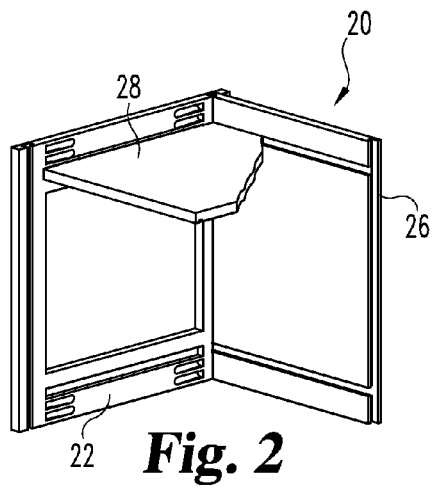
FIG. 2 is a partial perspective view of one embodiment of a cabinet device.

A cabinet device 20 is formed by assembling together front panel 22, right side panel 24, left side panel 26, top panel 28, and bottom panel 30. Optionally, a rear panel 32 is assembled onto cabinet device 20. Right side panel 24 is connected to front panel 22 by sliding groove 60 and the edge 160 (FIG. 7) into master keyway 40 (FIG. 4) as shown in FIG. 1. Left side panel 26 is connected to front panel 22 in an orientation perpendicular to the front panel 22 by sliding groove 80 and the edge 180 (FIG. 10) into the other master keyway 40 (FIG. 4) as shown in FIG. 1. By sliding groove 60 and edge 160 into master keyway 40, right side panel 24 is connected to front panel 22 in an orientation perpendicular to the front panel 22. Left side panel 26 is connect to front panel 22 by sliding groove 80 and edge 180 (FIG. 10) into the other master keyway 40 (FIG. 4) as shown in FIG. 1. By sliding groove 80 and edge 180 into the other master keyway 40, left side panel 26 is perpendicular to the front panel 22. Right side panel 24 and left side panel 26 are interchangeable or identical to allow either panel to be assembled with either master keyway 40 (FIG. 4) of front panel 22. Top panel 28 is connected to front panel 22 in an orientation perpendicular to the front panel 22 by sliding each of grooves 100 and the corresponding edge 200 (FIG. 13) into either of side keyway 58 (FIG. 8) of right side panel 24 or side keyway 78 (FIG. 11) of left side panel 26. Additionally, top extender 98 of top panel 28 fits into groove 42. Bottom panel 30 is connected to front panel 22 in an orientation perpendicular to the front panel 22 by sliding each of grooves 120 and the corresponding edge 220 (FIG. 16) into the remaining side keyway 58 (FIG. 8) of right side panel 24 and the remaining side keyway 78 (FIG. 11) of left side panel 26. Bottom extender 118 of bottom panel 30 fits into the remaining groove 42. Top panel 28 and bottom panel 30 are interchangeable or identical such that top panel 28 can fit in the location for bottom panel 30 and bottom panel 30 can fit in the location for top panel 28.

Optionally, rear panel 32 fits onto right side panel 24, left side panel 26, top panel 28, and bottom panel 30. In particular, one of back grooves 140 and edges 240 is inserted into side notch 62 (FIG. 7) of right side panel 24 and the other of back grooves 140 and edges 240 is inserted into side notch 82 (FIG. 10) of left side panel 26. Additionally, one of slots 138 covers or fits over upper portion 90 (FIG. 12) of top panel 28 and the other of slots 138 covers or fits over upper portion 110 (FIG.

15) of bottom panel 30. Rear panel 32 is configured such that it is reversible to the extent that either of slots 138 fits over either upper portion 90 (FIG. 12) or upper portion 110 (FIG. 15) and either of back grooves 140 and edges 240 is inserted into (FIG. 20) either side notch 62 (FIG. 7) or side notch 82 (FIG. 10).

In one embodiment, an adhesive is applied between groove 60 and edge 160 (FIG. 7) and master keyway 40 (FIG. 4) for both of the connections between right side panel 24 and front panel 22 and between left side panel 26 and front panel 22. In the same embodiment or another embodiment, adhesive is applied between each of grooves 100 and edges 200 (FIG. 13), side keyway 58 (FIG. 8), and side keyway 78 (FIG. 11), to attach top panel 28 to right side panel 24 and left side panel 26. Similarly, adhesive is applied between each of grooves 120 and edges 220 (FIG. 16), side keyway 58 (FIG. 8), and side keyway 78 (FIG. 11), to attach bottom panel 30 to right side panel 24 and left side panel 26. Adhesive can also be applied to top extender 98 (FIG. 12) and groove 42 (FIG. 5) to attach top panel 28 to front panel 22. Likewise, adhesive can be applied to bottom extender 118 (FIG. 15) and groove 42 (FIG. 5) to attach bottom panel 30 to front panel 22. Optionally, adhesive can be applied to each of slots 138 (FIG. 19), upper portion 90 (FIG. 12), and upper portion 110 (FIG. 15) to attach rear panel 32 to top panel 28 and bottom panel 30. In another form, staples, screws, or other fasteners can be used to attach each of slots 138 of rear panel 32 to top panel 28 and bottom panel 30. Also optionally, adhesive can be applied to each of back grooves 140 and edges 240 (FIG. 20), side notch 62 (FIG. 7), and side notch 82 (FIG. 10) to attach rear panel 32 to right side panel 24 and left side panel 26. Examples of adhesive are wood glue, carpenters glue, epoxy, or polyvinyl acetate (PVA), to name a few.

While the invention has been illustrated and described in detail in the drawings and foregoing description, the same is to be considered as illustrative and not restrictive in character, it being understood that all changes and modifications that come within the spirit of the invention are desired to be protected.

What is claimed is:

1. A cabinet system comprising:
   a front panel having a front face and a back face, a pair of master keyways extending in parallel along opposite sides of the back face of the front panel, each of the master keyways extending from one edge of the front panel to an opposite edge of the front panel, each master keyway having an L shaped cross section recessed in the back face, the L shaped cross section having five ordered adjacently connected surfaces wherein a first surface is perpendicular to the back face and to a second surface, the second surface is parallel to the back face and perpendicular to a third surface, the third surface is perpendicular to a fourth surface and parallel to the first surface, the fourth surface is parallel to the back face and perpendicular to a fifth surface, the fifth surface is perpendicular to the back face;
   a pair of side panels, each of the side panels having an interior face and an exterior face, each of the side panels having an upper side keyway and a lower side keyway extending in parallel along upper and lower portions, respectively, of the interior face of the side panel, each side keyway having an L shaped cross section recessed in the interior face, the L shaped cross section having five ordered adjacently connected surfaces wherein a first surface is perpendicular to the interior face and to a second surface, the second surface is parallel to the interior face and perpendicular to a third surface, the third surface is perpendicular to a fourth surface and parallel to the first surface, the fourth surface is parallel to the interior face and perpendicular to the fifth surface, the fifth surface is perpendicular to the interior face, each of said side panels further including a groove providing the side panel with an edge having an L shaped cross section, the L shaped edge of one of the side panels being received within one of the master keyways in the front panel and coupling the side panel with the front panel, the L shaped edge of the other of the side panels being received within the other of the master keyways in the front panel and coupling the other of the side panels with the front panel;
   a top panel having a pair of grooves extending adjacent opposed edges of the top panel and providing the top panel with the opposed edges having L shaped cross sections sized to be slidingly received in one of the upper side keyways, one of the L shaped edges of the top panel being received within the upper side keyway of one of the side panels and coupling the top panel with the side panel, the other of the L shaped edges of the top panel being received within the upper side keyway of the other of the side panels and coupling the top panel with the other of the side panels; and
   a bottom panel having a pair of grooves extending adjacent opposed edges of the bottom panel and providing the bottom panel with the opposed edges having L shaped cross sections sized to be slidingly received in one of the lower side keyways, one of the L shaped edges of the bottom panel being received within the lower side keyway of one of the side panels and coupling the bottom panel with the side panel, the other of the L shaped edges of the bottom panel being received within the lower side keyway of the other of the side panels and coupling the bottom panel with the other of the side panels, the side panels being oriented perpendicular to the front panel, and the top and bottom panels being oriented perpendicular to both the front panel and each of the side panels.

2. The cabinet system of claim 1 in which the front panel includes a groove extending along the back face of the front panel in a direction perpendicular to and between the master keyways, one of the top and bottom panels including an extender received within the groove in the back face of the front panel.

3. The cabinet system of claim 2 in which the front panel further includes a second groove extending along the back face of the front panel in a direction perpendicular to and between the master keyways, each of the top and bottom panels including an extender being received within a respective groove in the back face of the front panel.

4. The cabinet system of claim 1 in which the top and bottom panels are identical.

5. The cabinet system of claim 4 in which the two side panels are identical.

6. The cabinet system of claim 1 wherein the grooves of all of the pair of side panels, the top panel, and the bottom panel are the same cross-sectional size and shape.

7. The cabinet system of claim 6 wherein the grooves of all of the pair of side panels, the top panel, and the bottom panel have a U-shape.

8. The cabinet system of claim 1 further comprising:
   wherein each of the side panels has a side notch extending along a side portion, the side notch having four ordered adjacently connected surfaces wherein a first surface is perpendicular to the interior face and to a second surface, the second surface is parallel to the interior face and perpendicular to a third surface, the third surface is perpendicular to a fourth surface, and the fourth surface extends to an opposite edge of the side panel; and a rear panel having a first side portion and a second side portion, the rear panel having a pair of back grooves extending in parallel along the first and second side portions, each of the back grooves providing the rear panel with an edge having an L shaped cross section, one of the L shaped edges of the rear panel being received within the side notch of one of the side panels and the other of the L shaped edges of the rear panel being received within the side notch of the other of the side panels and contacting the rear panel with the pair of side panels.

9. The cabinet system of claim 8, wherein the rear panel has a pair of slots extending in parallel along upper and lower portions, one of the slots sized to receive a portion of the top panel to contact the rear panel with the top panel, the other of the slots sized to receive a portion of the bottom panel to contact the rear panel with the bottom panel.

10. The cabinet system of claim 1 in which the two side panels are identical.

11. The cabinet system of claim 1, wherein the pair of master keyways, the upper side keyway, and the lower side keyway are the same cross-sectional size.

12. A method of forming a cabinet comprising:

providing a front panel having a front face and a back face, a pair of master keyways extending in parallel along opposite sides of the back face of the front panel, each of the master keyways extending from one edge of the front panel to an opposite edge of the front panel, each master keyway having an L shaped cross section recessed in the back face, the L shaped cross section having five ordered adjacently connected surfaces wherein a first surface is perpendicular to the back face and to a second surface, the second surface is parallel to the back face and perpendicular to a third surface, the third surface is perpendicular to a fourth surface and parallel to the first surface, the fourth surface is parallel to the back face and perpendicular to a fifth surface, the fifth surface is perpendicular to the back face;

providing a first side panel having an interior face and an exterior face, the first side panel having an upper side keyway and a lower side keyway extending in parallel along upper and lower portions, respectively, of the interior face of the first side panel, the upper and lower side keyways having an L shaped cross section, the L shaped cross section having five ordered adjacently connected surfaces wherein a first surface is perpendicular to the interior face and to a second surface, the second surface is parallel to the interior face and perpendicular to a third surface, the third surface is perpendicular to a fourth surface and parallel to the first surface, the fourth surface is parallel to the interior face and perpendicular to a fifth surface, the fifth surface is perpendicular to the interior face, the first side panel further including a groove providing the first side panel with an edge having an L shaped cross section recessed in the interior face;

sliding the L shaped edge of the first side panel into one of the master keyways of the front panel to couple the first side panel with the front panel in an orientation perpendicular to the front panel;

providing a second side panel having an interior face and an exterior face, the second side panel having an upper side keyway and a lower side keyway extending in parallel along upper and lower portions, respectively, of the interior face of the second side panel, the upper and lower side keyways having an L shaped cross section, the L shaped cross section having five ordered adjacently connected surfaces wherein a first surface is perpendicular to the interior face and to a second surface, the second surface is parallel to the interior face and perpendicular to a third surface, the third surface is perpendicular to a fourth surface and parallel to the first surface, the fourth surface is parallel to the interior face and perpendicular to a fifth surface, the fifth surface is perpendicular to the interior face, the second side panel further including a groove providing the second side panel with an edge having an L shaped cross section recessed in the interior face;

sliding the L shaped edge of the second side panel into the other of the master keyways of the front panel to couple the second side panel with the front panel in an orientation perpendicular to the front panel, wherein the first and second side panels are coupled to the front panel;

providing a top panel having a pair of grooves extending adjacent opposed edges of the top panel and providing the top panel with the opposed edges having L shaped cross sections;

sliding the L shaped edges of the top panel into the upper side keyways of the first and second side panels to couple the top panel with the first and second side panels in an orientation perpendicular to the side panels;

providing a bottom panel having a pair of grooves extending adjacent opposed edges of the bottom panel and providing the bottom panel with the opposed edges having L shaped cross sections; and sliding the L shaped edges of the bottom panel into the lower side keyways of the first and second side panels to connect the bottom panel with the first and second side panels in an orientation perpendicular to the side panels and the top panel.

13. The method of claim 12 in which the top and bottom panels are identical.

14. The method of claim 13 in which the two side panels are identical.

15. The method of claim 12, further comprising:

wherein the first side panel has a side notch extending along a side portion and the second side panel has a side notch extending along a side portion, each of the side notches having four ordered adjacently connected surfaces wherein a first surface is perpendicular to the interior face and to a second surface, the second surface is parallel to the interior face and perpendicular to a third surface, the third surface is perpendicular to a fourth surface, and the fourth surface extends to an opposite edge of the side panel;

providing a rear panel having a first side portion and a second side portion, the rear panel having a pair of back grooves extending in parallel along the first and second side portions, each of the back grooves providing the rear panel with an edge having an L shaped cross section; and inserting one of the L shaped edges of the rear panel into the side notch of the first side panel and inserting the other of the L shaped edges of the rear panel into the side notch of the second side panel to contact the rear panel with the first and second side panels.

16. The method of claim 15 further comprising:

wherein the rear panel has a pair of slots extending in parallel along upper and lower portions;

inserting a portion of the top panel into one of the slots to contact the rear panel with the top panel; and inserting a portion of the bottom panel into the other of the slots to contact the rear panel with the bottom panel.

17. The method of claim 12 in which the front panel includes a groove extending along the back of the front panel in a direction perpendicular to and between the master keyways, one of the top and bottom panels including an extender configured to be received within the groove in the front panel, said method including sliding the one of the top and bottom panels into the side panels to position the extender within the groove in the back of the front panel to prevent movement of the pair of side panels relative to the front panel.

18. The method of claim 12 in which the front panel includes first and second grooves extending in parallel along the back of the front panel in a direction perpendicular to and between the master keyways, each of the top and bottom panels including an extender, said method including sliding each of the top and bottom panels into the side panels to position the extenders within respective grooves in the back of the front panel to prevent movement of the pair of side panels relative to the front panel.

19. The method of claim 12 in which the two side panels are identical.

20. The method of claim 12 wherein the grooves of all of the pair of side panels, the top panel, and the bottom panel are the same cross-sectional size and shape.

21. The method of claim 12 wherein the pair of master keyways, the upper side keyway, and the lower side keyway are the same cross-sectional size.

\* \* \* \* \*